(12) United States Patent
Zhidkov et al.

(10) Patent No.: US 7,668,246 B2
(45) Date of Patent: Feb. 23, 2010

(54) APPARATUS, METHOD AND COMPUTER PROGRAM FOR CORRECTING COMMON PHASE ERROR OF OFDM SIGNAL SYMBOLS

(75) Inventors: Sergei Zhidkov, Suwon-si (KR); Sato Masaki, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 933 days.

(21) Appl. No.: 10/845,331

(22) Filed: May 14, 2004

(65) Prior Publication Data

US 2005/0078599 A1 Apr. 14, 2005

(30) Foreign Application Priority Data

Oct. 10, 2003 (KR) .................... 10-2003-0070644

(51) Int. Cl.
*H04K 1/00* (2006.01)

(52) U.S. Cl. .................... 375/260; 375/344; 375/326; 375/229; 370/210; 370/480; 329/304

(58) Field of Classification Search ............... 375/344, 375/354, 326, 329, 260, 229; 370/210, 480; 329/304
See application file for complete search history.

(56) References Cited

U.S. PATENT DOCUMENTS

| 6,130,922 A * | 10/2000 | Stott et al. ............... 375/344 |
| 6,240,146 B1 * | 5/2001 | Stott et al. ............... 375/344 |
| 6,363,084 B1 * | 3/2002 | Dejonghe ............... 370/480 |
| 6,470,030 B1 * | 10/2002 | Park et al. ............... 370/480 |
| 6,628,730 B1 * | 9/2003 | Stott et al. ............... 375/344 |
| 6,720,824 B2 * | 4/2004 | Hyakudai et al. ........... 329/304 |
| 2002/0097813 A1 * | 7/2002 | Vaidyanathan ............... 375/326 |

| 2003/0128660 A1 | 7/2003 | Ito et al. |

(Continued)

FOREIGN PATENT DOCUMENTS

CN 1346186 4/2002

(Continued)

OTHER PUBLICATIONS

Foreign Search Report issued Feb. 17, 2005.

(Continued)

*Primary Examiner*—Chieh M Fan
*Assistant Examiner*—Eva Y Puente
(74) *Attorney, Agent, or Firm*—Harness, Dickey & Pierce, P.L.C.

(57) ABSTRACT

An apparatus, method and computer program for correcting a common phase error (CPE) of symbols of a received OFDM signal is described, in which FFT processing may be performed on a time domain OFDM to transform the received signal to a signal in the frequency-domain. Reordered output values resulting from the FFT processing and locations of the reordered output values may be stored. One or more of the stored reordered output values for a current symbol of the OFDM signal may be transferred based on receipt of an address, and each of the transferred reordered output values may be multiplied by a corresponding reordered output value of a previous OFDM signal symbol, so as to determine phase differences between the reordered output values of the current and previous OFDM signal symbols. The CPE of the transformed OFDM signal may be corrected based on the detected phase differences.

10 Claims, 3 Drawing Sheets

U.S. PATENT DOCUMENTS

2003/0185147 A1 * 10/2003 Taga et al. .................. 370/210

FOREIGN PATENT DOCUMENTS

| EP | 0 876 025 A1 | 11/1998 |
| EP | 1195961 (A2) | 4/2002 |
| JP | 10313283 A | 5/1997 |

OTHER PUBLICATIONS

"Common phase error correction with feedback for OFDM in wireless communication"; Abhayawardhana, V.S., Wassell, I,J; Dept. of Eng., Cambridge Univ., UK; Global Telecommunications Conference, 2002. GLOBECOM '02. IEEE; Publication Date Nov. 17-21, 2002; vol. 1; pp. 651-655.

British search report dated Jan. 30, 2007 in reference to Publication GB0622188.1.

Office Action for corresponding Chinese application No. 200410849325 dated Jan. 16, 2009.

Office Action corresponding to Chinese Patent Application No. 2004100849325 dated Jul. 3, 2009 w/English Translation.

* cited by examiner

APPARATUS, METHOD AND COMPUTER PROGRAM FOR CORRECTING COMMON PHASE ERROR OF OFDM SIGNAL SYMBOLS

PRIORITY STATEMENT

This U.S. nonprovisional patent application claims priority under 35 U.S.C. § 119 to Korean Patent Application 2003-70644, filed on Oct. 10, 2003 in the Korean Intellectual Property Office, the entire contents of which are hereby incorporated by reference.

BACKGROUND OF THE INVENTION

1. Field of the Invention

The present invention generally relates to an apparatus, method and computer program for correcting a common phase error (CPE) of symbols of a received orthogonal frequency division multiplexing (OFDM) signal.

2. Description of the Related Art

In general, a digital High Definition Television (HDTV) broadcast system may be divided into two parts, i.e., an image encoder and a modulator. The image encoder may compress about 1 Gbps of digital data, obtained from a high definition image source, for example, into about 15~18 Mbps of data. The modulator may transmit several Mbps of digital data to a receiving part of the HDTV broadcast system through a substantially narrow channel having about a 6~8 MHz frequency band.

A modulation technique used in an HDTV broadcast system typically may need high frequency band efficiency in order to transmit several Mbps of digital data through such a limited frequency band to a receiving part of the system. In addition, since an HDTV broadcast system may adopt a simultaneous terrestrial broadcast manner using VHF/UHF channels originally allotted for a conventional analog television broadcast, the HDTV broadcast system may require given characteristics so that the system may be sufficiently robust against channel interference that may be caused by analog television signals.

In an effort to enhance the efficiency of data transmission per bandwidth, and also to reduce and/or possibly prevent interference, orthogonal frequency division multiplexing (OFDM) has been adopted as a next-generation HDTV terrestrial broadcast technique. OFDM is digital modulation in which a column of symbols input in series is transformed into parallel data symbols, and the parallelized symbols are multiplexed into different subcarrier frequencies. In OFDM, multiple carriers which are orthogonal to one another may be used. Two carrier waves ('carriers') may be said to be orthogonal if the dot product of the two carrier waves is equal to zero. The use of orthogonal subcarriers allows the subcarriers' spectra to overlap, thus possibly increasing spectral efficiency. As long as orthogonality is maintained, it may still be possible to recover the individual subcarriers at the receiver with accuracy, despite the overlapping spectrum of the subcarriers.

Since OFDM signals may be generated by multiple carrier frequencies, OFDM signals may be vulnerable to tuner phase noise. Tuner phase noise may affect an OFDM signal in at least two different ways. For example, tuner phase noise may introduce low-frequency phase variations. The result of these variations may be a constant phase rotation for all of the subcarriers in the frequency domain. This phenomenon is referred to as a common phase error (CPE). Second, tuner phase noise may cause inter-carrier interference (ICI), which is determined by high-frequency phase noise variations. The result of the ICI may be signal-to-noise ratio degradation due to interference from the other subcarriers. The occurrence of the two phenomena, i.e., CPE and ICI, may depend on the spectral properties of the phase noise and frequency spacing between adjacent subcarriers of the OFDM signal.

CPE generally may cause HDTV broadcast system performance to deteriorate. However, CPE may be estimated based on the received OFDM signals and then corrected. Conventional CPE correction methods have been suggested by J. H. Scott in the article entitled "The DVB Terrestrial (DVB-T) Specification and Its Implementation to a Practical Modem" (International Broadcasting Convention, 1996) and P. Robertson and S. Kaiser in the article entitled "Analysis of the Effects of the Phase Noise in Orthogonal Frequency Division Multiplexing (OFDM) Systems" (IEEE Int. Conf. On Communication, ICC'95).

Figure 1:
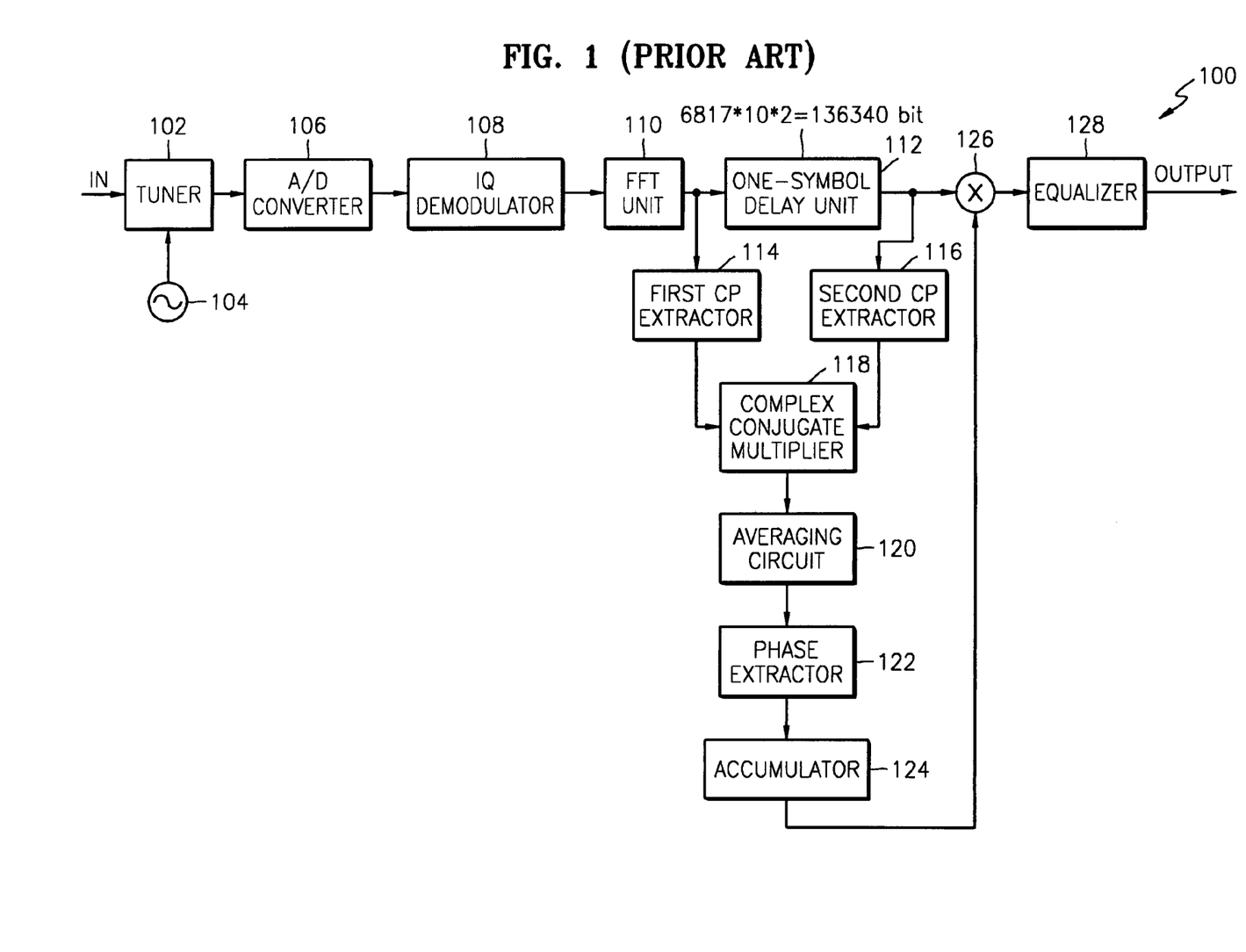
FIG. 1 is a block diagram of a prior art OFDM signal receiving apparatus.

FIG. 1 is a block diagram of a prior art OFDM signal receiving apparatus. An OFDM signal; in general, may include a plurality of subcarriers having a given frequency, amplitude, and phase. These subcarriers may be referred to as continual pilots (CPs). For example, a Digital Video Broadcast-Terrestrial (DVB-T) system uses 45 CPs in a 2K mode and uses 177 CPs in a 8K mode. Referring to FIG. 1, in a OFDM signal receiving apparatus 100, an input signal IN may be converted into an intermediate frequency signal by a tuner 102 and a local oscillator 104. The intermediate frequency signal may be converted into a digital signal by an A/D converter 106 and converted into a complex baseband signal by an IQ demodulator 108. The output of the IQ demodulator 108 may be provided to a Fast Fourier Transform (FFT) unit 110 so that a guard interval is removed from each OFDM symbol of the received complex baseband signal (i.e., of the OFDM signal) for carrying out fast Fourier transformation in order to transform time-domain signals into frequency-domain signals.

A first CP extractor 114 may extract first CP signals CP1 of a given symbol of the OFDM signal from an output of the FFT unit 110, and may transmit the CP1 signals to a complex conjugate multiplier 118. The output of the FFT unit 110 may also be transmitted to a second CP extractor 116 via a one-symbol delay unit 112. The second CP extractor 116 may extract second CP signals CP2 from a previous symbol of the OFDM signal passing through the one-symbol delay unit 112, and may transmit the CP2 signals to the complex conjugate multiplier 118. The complex conjugate multiplier 118 may multiply the CP1 and CP2 signals, which may have the same frequencies, thus detecting phase differences between the CP1 and CP2 signals.

An output of the complex conjugate multiplier 118 may be transmitted to an averaging circuit 120. The averaging circuit 120 may average detected phases of all CP signals in a given symbol received from the complex conjugate multiplier 118, in order to remove noise components. The averaging circuit 120 may output a complex signal to a phase extractor 122. The phase extractor 122 may detect the phase of the complex signal. Phase detection outputs of the phase extractor 122 may be accumulated in an accumulator 124. The accumulator 124 may provide an accumulated output to a phase rotator 126, so that the one-symbol-delayed signal, output from the one-symbol delay unit 112, may be rotated in an opposite direction.

CPE correction by the prior art OFDM signal receiving apparatus 100 may be performed as follows. CP subcarriers of a current OFDM symbol may be multiplied by complex conjugates of subcarriers from a previous OFDM symbol, which may be expressed by Equation (1).

$$Ri[kcp] \cdot Ri-1*[kcp] = \qquad (1)$$

$$e^{j(\phi_i-\phi_{i-1})}|H[kcp]|^2 Xi[kcp]Xi-1*[kcp] = \frac{16}{9}|H[kcp]|^2 e^{(\phi_i-\phi_{i-1})}$$

In Equation (1), Ri[k] may represent a signal received after FFT, i.e., a k-th subcarrier of an i-th OFDM symbol. H[k] may represent a channel frequency response to the k-th subcarrier, kcp may represent the location of a CP, and 16/9 represents the power of a CP subcarrier, as defined by the standards specified for DVB-T systems.

A differential phase error, $\Delta CPE_{i,i-1}$, may then be obtained by averaging one OFDM symbol and by extracting the phase of an averaged signal, expressed by Equation (2).

$$\Delta CPE_{i,i-1} = \angle\left[E\left(\frac{16}{9}|H[k]|^2 e^{j(\phi_i-\phi_{i-1})}\right)\Big|_{k \subset kcp}\right] = \angle e^{j(\phi_i-\phi_{i-1})} = \phi_i - \phi_{i-1} \qquad (2)$$

A CPE, which may be obtained by accumulating differential phase errors, may be calculated using Equation (3).

$$CPE_i = \qquad (3)$$

$$\sum_{j=1}^{i} \Delta CPE_{j,j-1} = (\phi_i - \phi_{i-1}) + (\phi_{i-1} - \phi_{i-2}) + \ldots + (\phi_i - \phi_0) = \phi_1 - \phi_0$$

The calculated CPE includes a given level of phase offset $\phi_0$. However, since the given phase offset $\phi_0$ may be compensated for by the equalizer 128, the given phase offset $\phi_0$ may have a minimal adverse affect on HDTV system performance.

Figure 2:
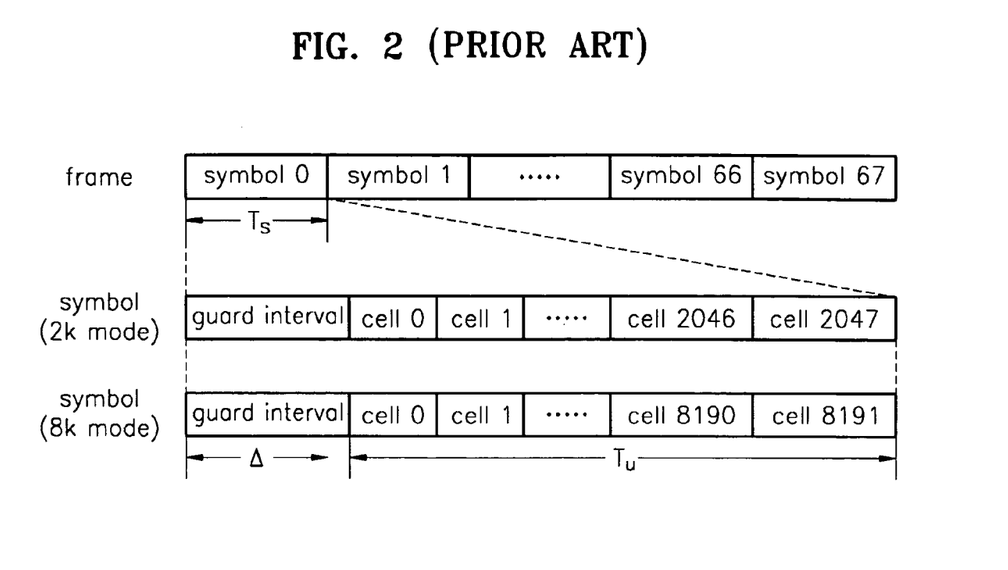
FIG. 2 is a diagram illustrating the structure of an OFDM frame.
Figure 3:
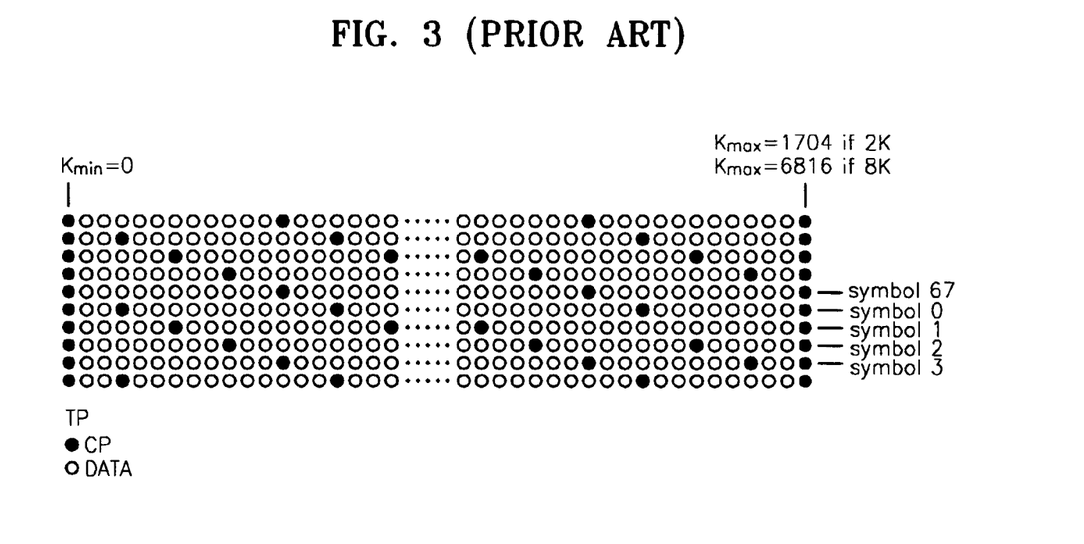
FIG. 3 is a diagram illustrating the structure of an OFDM symbol.

FIG. 2 illustrates the structure of an OFDM frame; and FIG. 3 is a diagram illustrating the structure of an OFDM symbol. FIGS. 2 and 3 are provided to illustrate the relatively complicated hardware structure of the OFDM signal receiving apparatus 100 of FIG. 1, due to the inclusion of the one-symbol delay unit 112.

As shown in FIG. 2, OFDM symbols may be classified into 2K mode OFDM symbols and 8K mode OFDM symbols according to the FFT sizes specified by the DVB-T standards. As shown in FIG. 3, CPs included within a given OFDM symbol may have corresponding designated locations within the given symbol. These designated locations may be different from designated locations in another given OFDM symbol. Therefore, as seen from a direction of time, one OFDM symbol may be understood as a continuous signal comprised of data, CPs, and transmission parameter signals, as shown in FIG. 3.

In DVB-T 8K mode, an OFDM symbol includes 6817 subcarriers. Supposing that I and Q data are each represented by 10 bits, the one-symbol delay unit 112 thus requires memory capable of storing as many as 136340 bits (6817×10×2=136340). Accordingly, the hardware structure of the OFDM signal receiving apparatus 100 may be cumbersome and require a relatively complex configuration, which may also require additional space or area to accommodate a larger OFDM signal receiving apparatus 100.

SUMMARY OF THE INVENTION

An exemplary embodiment of the present invention is directed to an orthogonal frequency division multiplexing (OFDM) demodulator. The demodulator may include a fast Fourier transformation (FFT) calculation block which subjects a received OFDM signal to FFT processing, and a correction block with corrects a common phase error (CPE) of the transformed OFDM signal. The FFT calculation block may include an output shuffle memory which may store reordered output values resulting from the FFT processing of the received OFDM signal, a continual pilot (CP) location memory which may store locations of reordered CPs that correspond to the reordered output values, and a switch that may transfer a reordered output value from the output shuffle memory for each reordered CP location of a current OFDM signal to the correction block, based on an output address received from the CP location memory. The correction block may include a CP memory which may store a reordered output value transferred by the switch for each reordered CP location of the current symbol. The CP memory may also store reordered output values of a previous OFDM signal symbol therein. A complex conjugate multiplier may multiply the reordered output value for each reordered CP location of the current symbol by a corresponding reordered output value for each reordered CP location of the previous symbol to determine phase differences between the reordered output values of the current and previous OFDM signal symbols. The correction block may include a phase detection and accumulation block which may detect and accumulate the average phase values of one or more symbols of the OFDM signal based on the determined phase differences, so as to provide a phase detection and accumulation block output. Based on the phase detection and accumulation block output, a phase rotator of the correction block may correct a CPE of the symbols of the OFDM signal by rotating an output from the FFT calculation block in an opposite direction.

Another exemplary embodiment of the present invention is directed to a method of correcting a common phase error (CPE) of symbols of an OFDM signal. In the method, an OFDM signal may be received and subject to FFT processing. Reordered output values resulting from the FFT processing may be stored, as well as locations corresponding to the reordered output values. Given reordered output values may be transferred, for corresponding reordered locations of a current OFDM signal symbol, based on receipt of output addresses related to the one or more reordered locations. Each of the reordered output values of the current symbol may be multiplied by a corresponding reordered output value of a previous OFDM signal symbol, in order to determine phase differences between the reordered output values of the current and previous symbols. Based on the phase differences, average phase values of one or more of the OFDM signal symbols may be detected and accumulated to provide an accumulated output. The accumulated output may be used to correct a CPE of one or more symbols of the OFDM signal by rotating a signal output from the FFT processing in an opposite direction.

Another exemplary embodiment of the present invention is directed to an apparatus that may include a calculation block for carrying out FFT processing on an OFDM signal received in a time domain, in order to transform the received OFDM signal to a signal in the frequency domain. The apparatus may include a correction block for correcting a common phase error (CPE) of the transformed OFDM signal. The correction block may store subcarrier values of a previous OFDM symbol in a memory thereof, and may compare the subcarrier values of the previous OFDM symbol with subcarrier values of a current OFDM symbol in order to detect phase differences between the subcarriers of the previous and current OFDM symbols. The detected phase difference may be applicable to determining a correction to the common phase error of the transformed OFDM signal.

Another exemplary embodiment of the present invention is directed to a FFT calculation block of an OFDM demodulator. The FFT calculation block may include a first memory which may store reordered output values obtained from subjecting a received OFDM signal to FFT processing, and a second memory which stores locations corresponding to the reordered output values. The FFT calculation block may include a switch which transfers a reordered output value from the first memory, for each stored reordered location of a given OFDM signal symbol, to a correction block demodulator, based on an output address received from the second memory.

Another exemplary embodiment of the present invention is directed to a calculation block of an OFDM demodulator. The demodulator may include a first memory which may store one or more received reordered output values corresponding to reordered locations of a current symbol of an OFDM signal that is subject to FFT processing in a FFT processor of the demodulator. The first memory may also store reordered output values of a previous OFDM signal symbol therein. A multiplier may multiply the reordered output value for each reordered location of the current symbol by a corresponding reordered output value for each reordered location of the previous symbol, so as to determine phase differences between the reordered output values of the current and previous OFDM signal symbols. A phase detection/accumulator may detect and accumulate average phase values of one or more OFDM signal symbols based on the determined phase differences, in order to provide a phase detection/accumulator output. Based on the phase detection/accumulator output, a phase rotator may correct a common phase error (CPE) of the OFDM signal symbols by rotating an output from the FFT processor in an opposite direction.

Another exemplary embodiment of the present invention is directed to a method of correcting a common phase error (CPE) symbols of an OFDM signal. In the method, FFT processing may be performed on an OFDM signal received in the time domain, to transform the received OFDM signal to a signal in the frequency domain. Reordered output values resulting from the FFT processing may be stored, and corresponding locations of the reordered output values may be stored. One or more of the stored reordered output values for a current symbol of the OFDM signal may be transferred based on an address of one or more corresponding stored locations. Each of the transferred reordered output values of the current symbol may be multiplied by corresponding reordered output values of a previous OFDM signal symbol, so as to determine phase differences between the reordered output values of the current and previous OFDM signal symbols. Based on the detected phase differences, a correction to the CPE of the transformed signal may be determined.

Another exemplary embodiment of the present invention is directed to a computer program product. The computer program product may include a computer-readable medium having computer program logic stored thereon for enabling a processor to correct a common phase error (CPE) of an OFDM signal. The computer program logic may cause the processor to receive an OFDM signal, and to perform FFT processing on the received OFDM signal. The computer program logic can further cause the processor to store reordered output values resulting from the FFT processing, and to store locations corresponding to the reordered output values. The computer program logic may cause the processor to transfer given reordered output values for at least one or more of the stored reordered locations of a current OFDM signal symbol, based on receipt of output addresses related to the at least one or more reordered locations. The computer program logic may further cause the processor to multiply each of the transferred reordered output values by a corresponding reordered output value for one or more reordered locations of a previous OFDM signal symbol, so as to determine phase differences between the reordered output values of the current and previous OFDM signal symbols. The computer program logic may further cause the processor to detect and accumulate average phase values of one or more symbols of the OFDM signal, based on the determined phase differences, so as to provide an accumulated output, and may cause the processor to correct a CPE of the one or more symbols of the OFDM signal by rotating an output from the FFT calculation in an opposite direction in accordance with the accumulated output.

Another exemplary embodiment of the present invention is directed to a computer program product. The computer program product may include a computer-readable medium having computer program logic stored thereon for enabling a processor to correct a common phase error (CPE) of an OFDM signal. The computer program logic may cause the processor to perform FFT processing on an OFDM signal received in the time domain, so as to transform the received OFDM signal to a signal in the frequency-domain. The computer program logic may further cause the processor to store reordered output values resulting from the FFT processing and locations of the reordered output values, and to transfer one or more of the stored reordered output values for a current symbol of the OFDM signal based on an address of one or more of the corresponding stored locations. The computer program logic may further cause the processor to multiply each of the transferred reordered output values of the current symbol by each of corresponding reordered output values of a previous OFDM signal symbol, so as to determine phase differences between the reordered output values of the current and previous OFDM signal symbols. The computer program logic may further cause the processor to determine a correction to the CPE of the transformed OFDM signal, based on the detected phase differences.

Another exemplary embodiment of the present invention is directed to a computer data signal embodied in a carrier wave. The computer data signal may include a first code segment for performing FFT processing on a received OFDM signal, a second code segment for storing reordered output values resulting from the FFT processing, and a third code segment for storing locations of the reordered output values. The computer data signal may also include a fourth code segment for transferring given reordered output values for at least one or more reordered locations of a current OFDM signal symbol, based on received output addresses related to the at least one or more reordered locations. The computer data signal may include a fifth code segment for multiplying each of the transferred reordered output values of the current symbol by a corresponding reordered output value corresponding to one or more reordered locations of a previous OFDM signal symbol, in order to determine phase differences between the reordered output values of the current and previous OFDM signal symbols. The computer data signal may include a sixth code segment for detecting and accumulating average phase values of one or more OFDM signal symbols, based on the determined phase differences, in order to provide an accumulated output. A seventh code segment may correct a CPE of the one or more symbols of the OFDM signals by rotating an output from the FFT processing in the opposite direction, in accordance with the accumulated output.

Another exemplary embodiment of the present invention is directed to a computer data signal embodied in a carrier wave. The computer data signal may include instructions for performing FFT processing on an OFDM signal received in the time domain, so as to transform the received OFDM signal to a signal in a frequency domain. The computer data signal may include instructions for storing reordered output values resulting from the FFT processing and locations of the reordered output values, and instructions for transferring one or more of the stored reordered output values for a current symbol of the OFDM signal based on an address of one or more corresponding locations. The computer data signal may include instructions for multiplying each of the transferred reordered output values of the current symbols by a corresponding reordered output value of a previous OFDM signal symbol, in order to determine phase differences between the reordered output values of the current and previous OFDM signal symbols. The computer data signal may also include instructions for determining a correction to the CPE of the transformed OFDM signal, based on the detected phase differences.

BRIEF DESCRIPTION OF THE DRAWINGS

The present invention will become more apparent by describing in detail exemplary embodiments thereof with reference to the attached drawings, wherein like elements are represented by like reference numerals, which are given by way of illustration only and thus do not limit the exemplary embodiments of the present invention.

DETAILED DESCRIPTION OF THE EXEMPLARY EMBODIMENTS

Figure 4:
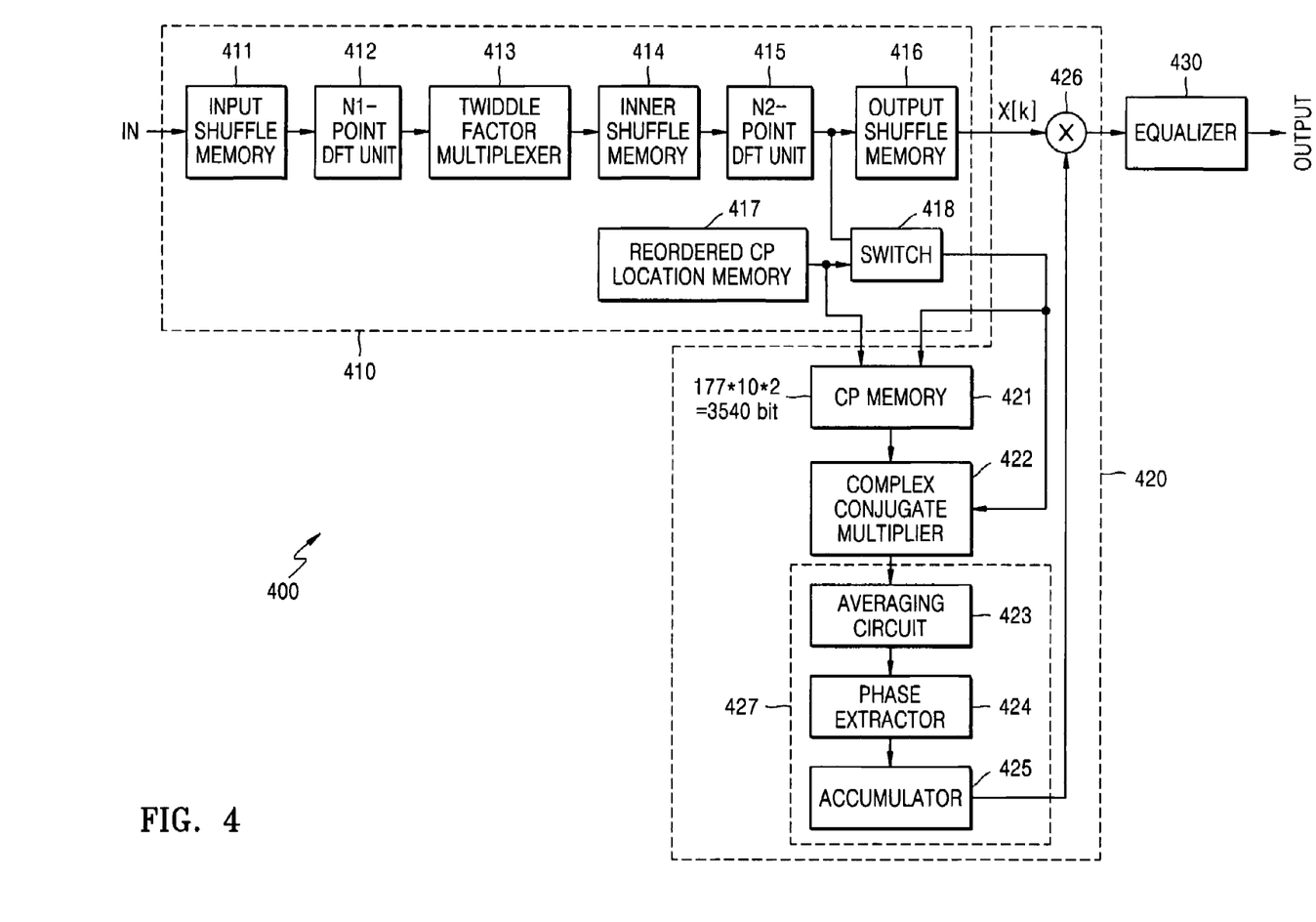
FIG. 4 is a block diagram of an OFDM demodulator according to an exemplary embodiment of the present invention.

FIG. 4 is a block diagram of an OFDM demodulator according to an exemplary embodiment of the present invention. Although FIG. 4 is generally described in a hardware setting, the exemplary embodiments described below may be embodied in hardware and/or software, for example.

In general, OFDM demodulator 400 includes a fast Fourier transformation (FFT) block 410 which may transform a complex baseband signal (i.e., an OFDM signal, shown as input signal 'IN' in FIG. 4) received from an IQ demodulator (not shown) in the time domain into frequency-domain signals using FFT processes. For example, the FFT calculation block 410 may transform a one-dimensional Discrete Fourier Transform (DFT) into a two-dimensional DFT using the Cooley-Turkey algorithm, for example. Use of the Cooley-Turkey algorithm is merely exemplary, one of ordinary skill in the art could determine a DFT using other known algorithms. A DFT, X(k), may be computed based on the exemplary Equation (4).

$$X[k] = \sum_{n=0}^{N-1} x[n] W_N^{kn}, k = 0, 1, 2, \ldots, N-1 \quad (4)$$

In Equation (4), x[n] may represent an input vector and X[k] an output vector for a k-th subcarrier, and $W_N^{kn}$ may represent a twiddle factor, for example. The twiddle factor may be expressed by $$W_N^{kn} = \exp\left(\frac{j2\pi nk}{N}\right).$$

Referring to FIG. 4, FFT calculation block 410 may include an input shuffle memory 411, which may be embodied as any suitable non-volatile memory such as a read only memory (ROM), and/or random access memory (RAM) for example. The exemplary embodiments are not limited to these memory configuration, as other equivalent types of memory are evident to one having ordinary skill in the art. Input shuffle memory 411 may realize a one-to-one mapping that is determined by an index function of the Cooley-Turkey algorithm, and may output an input signal IN to an $N_1$ point DFT unit 412. The one-to-one mapping may be determined by an index function as described below. For example, when the one-dimensional input signal x[n] has a size of N ($N=N_1 N_2$), n and k may be represented by exemplary Equations (5) and (6).

$$n = N_2 n_1 + n_2 \, (0 \leq n \leq N_{2-1}) \quad (5)$$

$$k = k_1 + N_1 k_2 \, (0 \leq k_1 \leq N_{1-1}, 0 \leq k_2 \leq N_{2-1}) \quad (6)$$

Accordingly, a DFT may be calculated by combining Equations (4)-(6), as shown in exemplary Equation (7).

$$X[k] = X[k_1 + N_1 k_2] \quad (7)$$

$$= \sum_{n_2=0}^{N_2-1} \sum_{n_1=0}^{N_1-1} x[N_2 n_1 + n_2] W_N^{(k_1 + N_1 k_2)(N_2 n_1 + n_2)}$$

$$= \sum_{n_2=0}^{N_2-1} \sum_{n_1=0}^{N_1-1} x[N_2 n_1 + n_2] W_N^{(k_1 + N_1 k_2)(N_2 n_1 + n_2)}$$

$$= \sum_{n_2=0}^{N_2-1} \sum_{n_1=0}^{N_1-1} x[N_2 n_1 + n_2] W_N^{N_2 k_1 n_1} W_N^{k_1 n_2} W_N^{N_1 k_2 n_2} W_N^{N_1 N_2 k_2 n_1}$$

$$= \sum_{n_2=0}^{N_2-1} \left[ \left( \sum_{n_1=0}^{N_1-1} x[N_2 n_1 + n_2] W_{N_1}^{k_1 n_1} \right) W_N^{k_1 n_2} W_{N_2}^{k_2 n_2} \right]$$

An $N_1$-point DFT, G[n2, k1], may be defined by Equation (8) below.

$$G[n_2, k_1] = \sum_{n_1=0}^{N_1-1} x[N_2 n_1 + n_2] W_{N_1}^{k_1 n_1} \quad (0 \leq k_1 \leq N_{1-1}, 0 \leq n_2 \leq N_{2-1}) \quad (8)$$

As $G[n_2, k_1]$ represents an $N_1$-point DFT, and referring back to Equation (7), $N_1$-point DFT may be carried out $N_2$ times, and each $N_1$-point DFT result may be multiplied by a twiddle factor $W_N^{k_1 n_2}$ in a twiddle factor multiplexer 413. The multiplication result from the twiddle factor multiplexer 413 may be stored in an inner shuffle memory 414, and $N_2$-point DFT may be carried out $N_1$ times. Inner shuffle memory 414 may be embodied by a suitable non-volatile memory as described regarding input shuffle memory 411, for example.

Hereinafter, the operation of the FFT calculation block 410 will be described in greater detail with reference to Equation (4) above. A one-dimensional input signal x[n] having a size of N ($N=N_1N_2$) may be mapped onto the input shuffle memory 411 as a $N_1 \times N_2$, two-dimensional array $x[n_1, n_2]$ in column major order, for example. One-dimensional DFT may be carried out for each column of the two-dimensional array $x[n_1, n_2]$ by the $N_1$-point DFT unit 412. As a result of the one-dimensional DFT, a two-dimensional array $G^T[n_2, k_1]$, which is a transpose of $G[n_2, k_1]$, may be obtained. Thereafter, $G^{-T}[n_2, k_1]$, which is a transpose of $G^T[n_2, k_1]$, may be obtained by multiplying each element of $G^T[n_2, k_1]$ by $W_N^{k_1 n_2}$ in twiddle factor multiplexer 413 and may be stored in the inner shuffle memory 414.

One-dimensional DFT may then be carried out for each column of $G^T[n_2, k_1]$ by an $N_2$-point DFT unit 415. As a result of the one-dimensional DFT, a $N_1 \times N_2$, two-dimensional array $X[n_1, n_2]$ may be obtained and provided to an output shuffle memory 416. The output shuffle memory 416 may output $X[n_1, n_2]$ in a row major order and then maps it into X[k]. Output shuffle memory 416 may be embodied by a suitable non-volatile memory as described above with respect to input shuffle memory 411, for example.

The output shuffle memory 416 may serve as a delay line for CPE correction. However, the output shuffle memory 416 is different from a typical delay line, such as the prior art one-symbol delay unit 112 of FIG. 1, providing different functions. For example, unlike the typical delay line, data passing through the output shuffle memory 416 may be rearranged in a given order, as defined by Equations (5) and (6), for example. Additionally, an output value read out from the output shuffle memory 416 may be used for a "read-then-write-in-the-same-address-mode" operation. In such an operation, a new value may be stored at the same place the corresponding output value used to be, for example. Therefore, given OFDM subcarriers do not exist in memory in such a way that the OFDM subcarriers have fixed memory addresses. In other words, subcarriers (or continual pilots (CPs)) of different OFDM symbols have different memory addresses. CP values of a previous OFDM symbol may be replaced by other CP values or other data subcarriers' values through a reordering process of a reordered CP location memory 417. Recorded CP location memory 417 may be embodied by suitable non-volatile memory such as ROM or RAM, for example.

The reordered CP location memory 417 may store the location of CPs reordered by Equations (5) and (6). Since the location of the reordered CPs can be identified in advance, the reordered CP location memory 417 can be employed as ROM in an exemplary case. In FIG. 4, a switch 418 may transmit an output of the $N_2$-point DFT unit 415 for each reordered CP location to the CPE correction block 420 in response to an address provided by the reordered CP location memory 417.

Referring again to FIG. 4, OFDM demodulator 400 may include a CPE correction block 420. The CPE correction block 420 may include a CP memory 421. The CP memory 421 may recognize an address signal from the reordered CP location memory 417 as a write signal and may store data output from the $N_2$-point DFT unit 415 based on the recognized write signal. In other words, the CP memory 421 may store CP values of one OFDM symbol. For example, in DVB-T 8K mode, one OFDM symbol includes 6,817 subcarriers and 177 CPs. Supposing that I and Q data of a given OFDM symbol are each represented with a resolution of 10 bits, the CP memory 421 requires no more than a 3540-bit memory (177×10×2=3540) to store the CP of the OFDM symbol. This may provide a substantial memory reduction as compared to memory required for the prior art one-symbol delay unit 112, which requires storage capacity to accommodate as much as 136,340 bits. Thus, an OFDM demodulator configured with the CP memory 421 may facilitate a less complex hardware structure of the OFDM demodulator 400, and may also substantially reduce the area requirements for the OFDM demodulator 400.

The CPE correction block 420 may also include a complex conjugate multiplier 422. The complex conjugate multiplier 422 may multiply an output of the $N_2$-point DFT unit 415 for each reordered CP location of a current OFDM symbol, by a corresponding output of the $N_2$-point DFT unit 415 for each reordered CP location of a previous OFDM symbol. In other words, the complex conjugate multiplier 422 may detect phase differences between the CP values of both the current OFDM symbol and the previous OFDM symbol, and may transmit the detected phase differences.

The CPE correction block 420 may also include a phase detection and accumulation block 427, which may include an averaging circuit 423, phase extractor 424 and accumulator 425. In general, phase detection and accumulation block 427 may detect and accumulate average phase signals of the OFDM symbols for a given OFDM signal, based on the detected phase differences between the CP signals that are received from the complex conjugate multiplier 422, for example.

The averaging circuit 423 may average detected phases of all CP signals in a given symbol in order to remove noise components. As a result of the averaging, the averaging circuit 423 may provide a complex signal to the phase extractor 424. The phase extractor 424 may detect the phase of the complex signal. The detected phase may correspond to an average, common phase difference between two consecutive OFDM symbols (i.e., previous and current OFDM symbols). Outputs of the phase extractor 424 may be accumulated in the accumulator 425. An output of the accumulator 425 may be provided to a phase rotator 426 so that a one-symbol-delayed, previous signal can be rotated in an opposite direction, for example, in order to output the OFDM signal.

Referring again to FIG. 4, OFDM demodulator may include an equalizer 430. The equalizer 430 may compensate an OFDM signal output from the phase rotator 426 for any distortion that may have occurred on a transmission channel. The equalizer 430 may compensate for any distortion present in the output OFDM signal output from phase rotator 426 by calculating a timing and frequency error value for the output OFDM signal based on the CP signals of the output OFDM signal.

The OFDM demodulator 400 according to the exemplary embodiments of the present invention may correct a CPE by storing CP values of a previous OFDM symbol in CP memory and comparing those CP values with CP values of a current OFDM symbol. Since memory having reduced storage capacity may be used in the OFDM demodulator 400 of FIG. 4, OFDM demodulator 400 may be configured with a relatively less complex hardware structure and may take up a reduced area, as compared to the prior art OFDM demodulator.

Although described primarily in terms of hardware above, the exemplary OFDM demodulator and methods illustrated by FIG. 4 may also be embodied in software as a computer program. For example, a program in accordance with the exemplary embodiments of the present invention may be a computer program product causing a computer to execute one of the exemplary methods of correcting CPE in symbols of an OFDM signal. The computer program product may include a computer-readable medium having computer program logic or code portions embodied thereon for enabling a processor of the apparatus to perform the methodology to correct CPE in accordance with one or more of the exemplary methods.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

The computer program logic may thus cause the processor to perform one or more of the exemplary correction methods described herein. Therefore, by causing a computer to execute the program, CPE of symbols of the OFDM signal may be corrected by the exemplary methods.

These programs may also be provided in the form of an externally supplied propagated signal and/or a computer data signal embodied in a carrier wave. The computer data signal embodying one or more instructions or functions of the exemplary methodology may be carried on a carrier wave for transmission and/or reception by an entity that executes the instructions or functions of the exemplary methodology. For example, the functions or instructions of the exemplary embodiments may be implemented by processing one or more code segments of the carrier wave in a computer controlling a given network configuration such as a HDTV broadcast system, where instructions or functions may be executed to correct CPE in OFDM symbols in accordance with the exemplary methods described herein.

Further, such programs, when recorded on computer-readable storage media, may be readily stored and distributed. The storage medium, as it is read by a computer, may enable the transmission of packets and/or blocks by the exemplary transmission methods described herein.

The exemplary embodiments of the present invention being thus described, it will be obvious that the same may be varied in many ways. For example, the functional blocks of FIG. 4 describing the exemplary apparatus and methods may be implemented in hardware and/or software. The hardware/software implementations may include a combination of processor(s) and article(s) of manufacture. The article(s) of manufacture may further include storage media and executable computer program(s).

The executable computer program(s) may include,the instructions to perform the described operations or functions. The computer executable program(s) may also be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed is:

1. An orthogonal frequency division multiplexing (OFDM) demodulator, comprising:
  a fast Fourier transformation (FFT) calculation block which subjects an OFDM signal to FFT processing on a received OFDM signal; and
  a correction block which corrects a common phase error (CPE) of the transformed OFDM signal,
  wherein the FFT calculation block includes:
    an output shuffle memory which receives output values resulting from the FFT processing of the received OFDM signal, the output shuffle memory storing reordered output values;
    continual pilot (CP) location memory which stores locations of reordered CPs that correspond to the reordered output values; and
    a switch which transfers at least one output value resulting from the FFT processing of the received OFDM signal, for each reordered CP location of a current OFDM signal symbol to the correction block, based on an output address received from the CP location memory, and
  wherein the correction block includes:
    a CP memory which stores the output value transferred by the switch for each reordered CP location of the current symbol, the CP memory also storing output values of a previous OFDM signal symbol therein;
    a complex conjugate multiplier which multiplies the output value stored in the CP memory resulting from the FFT processing of the received OFDM signal by a corresponding output value resulting from the FFT processing of the previous symbol to determine phase differences between the current and previous OFDM signal symbols;
    a phase detection and accumulation block which detects and accumulates average phase values of one or more symbols of the OFDM signal based on the determined phase differences to provide a phase detection and accumulation block output; and
    a phase rotator which corrects a CPE of the symbols of the OFDM signal by rotating an output from the FFT calculation block in an opposite direction, based on the phase detection and accumulation block output.

2. The OFDM demodulator of claim 1, further comprising:
  an equalizer connected to the phase rotator to compensate for any distortion of the OFDM signal on a transmission channel.

3. The OFDM demodulator of claim 1, wherein the reordered CP location memory is ROM.

4. The OFDM demodulator of claim 1, wherein the FFT calculation block further includes:
  an input shuffle memory which maps the OFDM signal, the OFDM signal embodied as a one-dimensional array of size N ($N=N_1N_2$), into a $N_1 \times N_2$, two-dimensional array in column major order;
  an $N_1$-point discrete Fourier transformation (DFT) unit which generates a first $N_1 \times N_2$, two-dimensional array by carrying out one-dimensional DFT on each row of the input shuffle memory;
  a twiddle factor multiplier which multiplies each element of the first $N_1 \times N_2$, two-dimensional array by a twiddle factor to obtain a result;
  an inner shuffle memory which stores the result of the multiplication; and
  an $N_2$-point DFT unit which generates a second $N_1 \times N_2$, two-dimensional array by carrying out one-dimensional DFT on each column of the input shuffle memory;
    wherein the output shuffle memory maps the second $N_1 \times N_2$, two-dimensional array in row major order to provide the FFT calculation block output.

5. A method of correcting a common phase error (CPE) of one or more symbols of an orthogonal frequency division multiplexing (OFDM) signal, comprising:
- receiving an OFDM signal in an input shuffle memory;
- performing FFT processing on the received OFDM signal to generate output values;
- storing reordered output values resulting from the FFT processing in an output shuffle memory;
- storing locations of the reordered output values in a continual pilot (CP) location memory;
- transferring at least one output value resulting from the FFT processing of the received OFDM signal based on output addresses related to one or more reordered locations to a continual pilot memory;
- multiplying each of the transferred at least one output value of a current OFDM signal symbol by a corresponding one of at least one output value of a previous OFDM signal symbol stored in the continual pilot memory in a multiplier to determine phase differences between the current and previous signal symbols;
- detecting and accumulating average phase values of one or more OFDM signal symbols, based on the determined phase differences, to provide an accumulated output; and
- correcting the CPE of the one or more symbols of the OFDM signal by rotating an output from the FFT in a direction opposite to the accumulated output using a phase rotator.

6. The method of claim 5, further comprising:
- compensating for any distortion of the OFDM signal on a transmission channel using an equalizer.

7. The method of claim 5, wherein the step of carrying out FFT further includes:
- mapping the OFDM signal onto the input shuffle memory, the OFDM signal embodied as a one-dimensional array of size N ($N=N_1N_2$), into a $N_1 \times N_2$, two-dimensional array in column major order;
- generating a first $N_1 \times N_2$, two-dimensional array by carrying out one-dimensional DFT on each row of the two-dimensional array using a first DFT unit;
- multiplying each element of the first $N_1 \times N_2$, two-dimensional array by a twiddle factor in a twiddle factor multiplier;
- storing the result of the multiplication in an inner shuffle memory;
- generating a second $N_1 \times N_2$, two-dimensional array by carrying out one-dimensional DFT on each column of the input shuffle memory using a second DFT unit; and
- mapping the second $N_1 \times N_2$, two-dimensional array in row major order using an output shuffle memory and outputting the FFT processed OFDM signal.

8. A computer-readable storage medium, on which is recorded a program adapted to cause a computer to execute the method of claim 5.

9. An apparatus, comprising:
- a calculation block for carrying out FFT processing on an OFDM signal received in the time domain to transform the received OFDM signal to an OFDM signal in the frequency-domain, wherein the calculation block includes
  - a continual pilot (CP) location memory for storing locations of reordered CPs that correspond to the received OFDM signal; and
  - a switch for transferring at least one value resulting from the FFT processing of the received OFDM signal for each reordered CP location of a current OFDM signal symbol to a correction block based on an output address received from the CP location memory; and
- the correction block for correcting a common phase error (CPE) of the transformed OFDM signal, wherein the correction block includes
  - a CP memory for storing the at least one value transferred by the switch for each reordered CP location of the current OFDM signal symbol, the CP memory also storing at least one value of a previous OFDM signal symbol therein.

10. The apparatus of claim 9, wherein a subcarrier value represents a subcarrier of a given OFDM signal symbol that has a given amplitude, frequency and phase.

* * * * *